(12) United States Patent
Misuraca et al.

(10) Patent No.: US 12,407,524 B2
(45) Date of Patent: Sep. 2, 2025

(54) CERTIFICATE REVOCATION AND MANAGEMENT FOR AUTONOMOUS VEHICLES

(71) Applicant: GM Cruise Holdings LLC, San Francisco, CA (US)

(72) Inventors: Graziano Giuseppe Misuraca, New York, NY (US); Collin Richard Mulliner, Brooklyn, NY (US); Charles Miller, St. Louis, MO (US)

(73) Assignee: GM Cruise Holdings LLC, San Francisco, CA (US)

( * ) Notice: Subject to any disclaimer, the term of this patent is extended or adjusted under 35 U.S.C. 154(b) by 434 days.

(21) Appl. No.: 17/548,947

(22) Filed: Dec. 13, 2021

(65) Prior Publication Data

US 2023/0188361 A1 Jun. 15, 2023

(51) Int. Cl.
*H04L 9/32* (2006.01)
*H04L 9/40* (2022.01)

(52) U.S. Cl.
CPC ........ *H04L 9/3268* (2013.01); *H04L 63/0428* (2013.01); *H04L 63/068* (2013.01); *H04L 2209/84* (2013.01)

(58) Field of Classification Search
None
See application file for complete search history.

(56) References Cited

U.S. PATENT DOCUMENTS

2015/0222604 A1* 8/2015 Ylonen ................. H04L 9/3263
713/171
2020/0220737 A1* 7/2020 Ryu ........................ G06F 16/29

* cited by examiner

*Primary Examiner* — Brandon Hoffman
(74) *Attorney, Agent, or Firm* — Honigman LLP; Matthew H. Szalach; Jonathan P. O'Brien

(57) ABSTRACT

Systems and methods are provided for managing a device in a vehicle, comprising: receiving a device registration request for the device; evaluating a list that includes a plurality of unique identifiers associated with a plurality of certificates; determining whether a particular unique identifier associated with a particular certificate is valid based on a length of time for the particular certificate; and communicating a signed version of the particular certificate to authorize a session for the device.

19 Claims, 13 Drawing Sheets

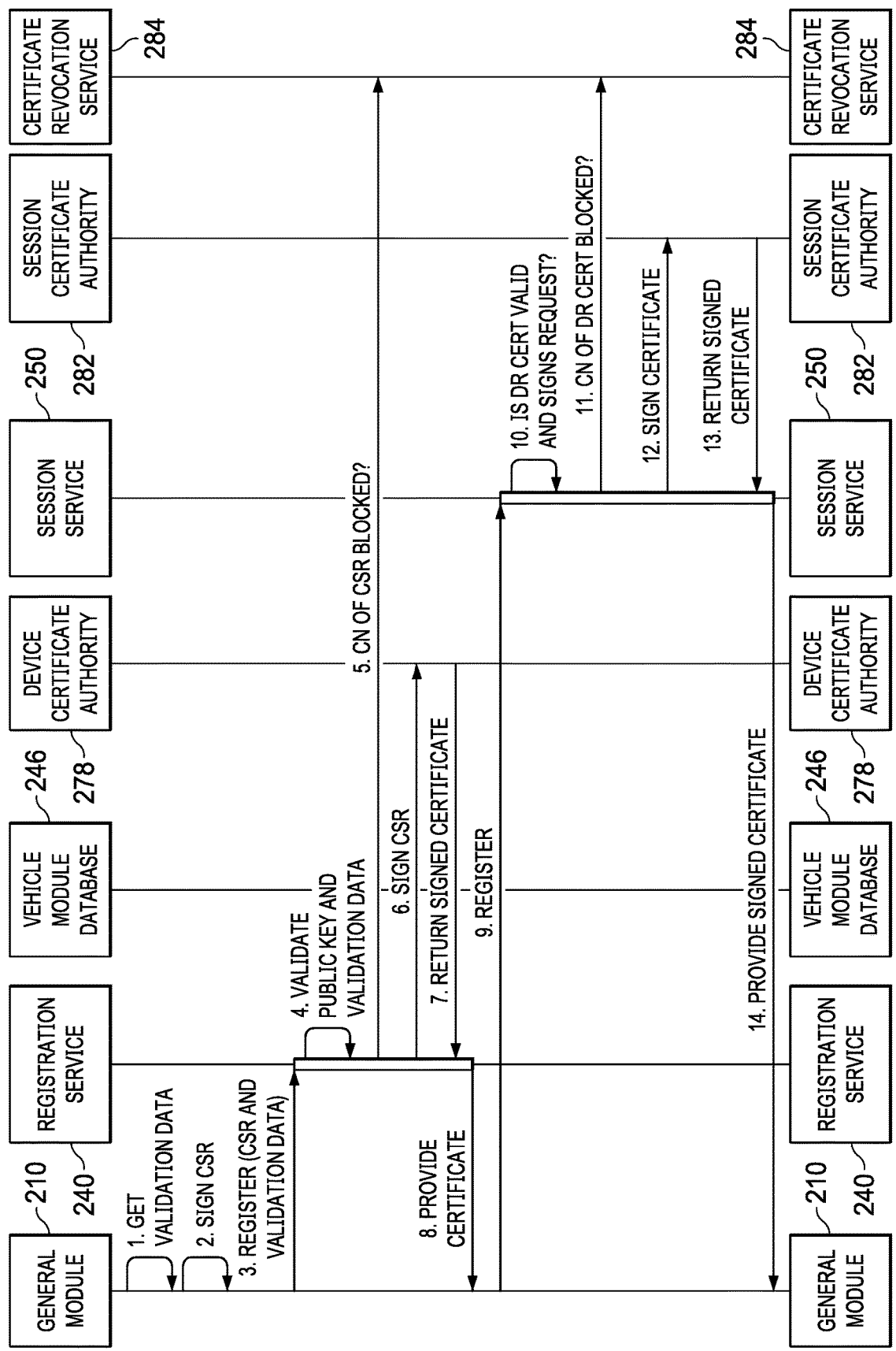

Unique ID Example

Certificate #1:
ADSCA_VIN_5G00000000001
 ADSC         = Device_Type
  A          = Device_Identifier
   VIN_5G00000000001 = VIN Certificate #2:
MCTM_VIN_5G00000000001
 MCTM        = Device_Type
          = (No Device_Identifier)
   VIN_5G00000000001 = VIN

FIG. 2C

Certificate Creation Example

Car #1 (domainA):
 Unique ID: ADSCA_VIN_5G000000001
  valid from: 01-01-2021:00:00:00 - 01-01-2021:23:59:59
 Unique ID: MCTM_VIN_5G000000001
  valid from: 01-01-2021:00:00:00 - 01-01-2021:23:59:59
Car #2 (domainB):
 Unique ID: ADSCA_VIN_5G000000002
  valid from: 01-01-2021:00:00:00 - 01-01-2021:23:59:59
 Unique ID: MCTM_VIN_5G000000002
  valid from: 01-01-2021:00:00:00 - 01-01-2021:23:59:59

Certificate Revocation
First Example:
Revoke all certificates of Car #1:
    VIN=5G000000001 newer than 01-01-2021:23:59:59
Second Example:
Revoke ADSCA from Car #2:
    UID=ADSCA_VIN_5G000000002 newer than 01-01-2021:23:59:59

Long-term certificate creation Example
Note: the longer valid from-to range (multiple years).

Car #1 (domainA):
    Unique ID: ADSCA_VIN_5G000000001
        valid from: 01-01-2021:00:00:00 - 01-01-2035:23:59:59
    Unique ID: MCTM_VIN_5G000000001
        valid from: 01-01-2021:00:00:00 - 01-01-2035:23:59:59

Car #2 (domainB):
    Unique ID: ADSCA_VIN_5G000000002
        valid from: 01-01-2021:00:00:00 - 01-01-2035:23:59:59
    Unique ID: MCTM_VIN_5G000000002
        valid from: 01-01-2021:00:00:00 - 01-01-2035:23:59:59

MCTM

| Device_name | Device_type | validation_type | CN_NAME |
|---|---|---|---|
| MCTM v 1.0 | MCTM | MCTM ADIM | CN=MCTM_VIN_<vin>_AP |
| MCTM v 1.0 | MCTM | NAD1 ADIM | CN=MCTM_VIN_<vin>_NAD1 |
| MCTM v 1.0 | MCTM | NAD2 ADIM | CN=MCTM_VIN_<vin>_NAD2 |
| MCTM v 1.0 | MCTM | NAD3 ADIM | CN=MCTM_VIN_<vin>_NAD3 |

602

HPDC

| Device_name | Device_type | validation_type | CN_NAME |
|---|---|---|---|
| AV TABLET v 1.0 | AV_TABLET | TABLET1 MCTM | CN=AV_TABLET1_VIN_<vin> |
| AV TABLET v 1.0 | AV_TABLET | TABLET2 MCTM | CN=AV_TABLET2_VIN_<vin> |
| AV TABLET v 1.0 | AV_TABLET | TABLET3 MCTM | CN=AV_TABLET3_VIN_<vin> |

604

ADSC

| Device_name | Device_type | validation_type | CN_NAME |
|---|---|---|---|
| AV ADSC v 1.0 | AV_ADSC | ADSCA ADIMA | CN=AV_ADSCA_VIN_<vin> |
| AV ADSC v 1.0 | AV_ADSC | ADSCB ADIMA | CN=AV_ADSCB_VIN_<vin> |
| AV ADSC v 1.0 | AV_ADSC | ADSCC ADIMA | CN=AV_ADSCC_VIN_<vin> |
| AV ADSC v 1.0 | AV_ADSC | ADSCD ADIMA | CN=AV_ADSCD_VIN_<vin> |

CERTIFICATE REVOCATION AND MANAGEMENT FOR AUTONOMOUS VEHICLES

FIELD OF THE DISCLOSURE

The present disclosure relates generally to autonomous vehicles (AVs) and, more specifically, to systems and methods for certificate revocation and management for AVs.

BACKGROUND

AVs, also known as self-driving cars, driverless vehicles, and robotic vehicles, are vehicles that use multiple sensors to sense the environment and move without human input. Automation technology in the AVs enables the vehicles to drive on roadways and to accurately perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

AVs include many services and applications. Network security is a one of the concerns for systems that operate independently of direct human control. More specifically, network security can protect a system from data breaches, intrusions, and other cyber threats.

A typical AV includes a control computer that receives inputs from a host of sensors and, based on those inputs, makes control decisions for the vehicle. The computer may then send signals to drive actuators to achieve a desired control function. In some cases, AVs can implement the use of certificates. The term "certificate" can include any suitable digital information in any appropriate format or field and be inclusive of unique identifiers (IDs), Vehicle Identification Numbers (VINs), component identifiers, manufacturing descriptors, passwords, storage account keys, shared access signatures, encryption keys (both public and private), decryptions keys, etc. The certificate can prove its authenticity and, therefore, be trusted by a proprietary organization that is responsible for the device.

Many certificates have a limited lifespan and at the end of the lifespan, the certificates expire, become invalid, or become untrusted. Management of these certificates and their revocation, along with the preceding device and session registration itself, is critical to resolving many of the important security issues highlighted in the foregoing discussion.

SUMMARY

Systems and methods are provided for revoking certificates and for managing such certificates for AVs. In particular, systems and methods are provided that involve a configuration, which is based on a unique ID (or a group ID) and a lifespan of a corresponding certificate for the unique ID. The lifespan can be a fixed value (e.g., 24 hours), but this parameter can easily be configured differently based on specific scenarios. For example, using these two values, the system can express a revocation through the following configuration: Unique ID 'X' must have a certificate minted after timestamp 'Y.' This configuration can achieve a successful revocation because the system can recognize the length of time for which the certificate is valid. The system can also maintain a global revocation list to foster these management activities, as detailed below.

Systems and methods are provided for revoking devices and for managing certificates for AVs. According to one aspect of the present disclosure, a method for managing a device in an AV includes receiving a device registration request for the device; evaluating a list that includes a plurality of unique IDs associated with a plurality of certificates; determining whether a particular unique ID associated with a particular certificate is valid based on a length of time for the particular certificate; and communicating a signed version of the particular certificate to authorize a session for the device. In some implementations, the method can include evaluating the length of time for which the particular certificate is valid; and revoking the particular certificate using the particular unique ID.

In other example implementations, the method can also include blocking new certificates associated with the unique ID from being generated. Additionally, short-lived certificates having shorter time intervals and long-lived certificates having longer time intervals share a same unique ID. In other examples, the method can include receiving an authentication request associated with the unique ID; and evaluating a global revocation list to determine whether to authorize the authentication request, wherein the global revocation list comprises one or more revoked IDs. Certain example embodiments include determining that a given device was revoked in error; and enabling the given device based on updating a global revocation list, wherein the global revocation list comprises one or more revoked IDs. The unique ID can be stored in a CommonName (CN) field of the certificate. Additionally, the unique ID can be partitioned into multiple subparts. The multiple subparts include a VIN, a Device Type, and a Device Identifier associated with the device.

Some example embodiments of the method may include determining whether a group ID associated with a given certificate is valid based on a length of time for the given certificate; and communicating a signed version of the given certificate to authorize a session for a given device. The device registration request and a session registration request are received through a designated communication path that restricts Internet access. The method can also include communicating an update to firmware stored in a plurality of devices for a plurality of AVs; and rotating one or more session keys to be used for the plurality of devices, wherein the session keys are valid for a designated length of time. In other example implementations, the device registration request includes trace data that is unique to the device, and wherein one or more communications for registration of the device are encrypted such that the trace data is not exposed.

Additionally, systems and methods are provided for registering devices and for managing certificates for AVs. In particular, systems and methods are provided for provisioning the acquisition of certificates and sensitive information for AVs. Additionally, device registration can be used in conjunction with such provisioning to securely operate and protect AVs from attackers. Certificates are securely distributed to AVs for use by various services and applications in the AV.

According to one aspect for registration and session management from the perspective of an AV, a method for managing a device in an AV includes communicating a device registration request for the device, wherein the device registration request includes trace data that is unique to the device; receiving a device certificate to authorize registration of the device; providing a signature for the device certificate; communicating a session registration request for the device; and receiving a signed session certificate to authorize a session for the device, wherein the signed session certificate includes a session key that is valid for a designated time period (e.g., 60 seconds, 1 hour, 24 hours, etc.). In various implementations, the communicating of the request for the device registration certificate includes: generating a keypair and a certificate signing request (CSR) based, at least in part, on the keypair. Each of these certificates can include any suitable digital information associated with authorizing, securing, or otherwise validating an identity, a device, a session, or a registration.

In some implementations, the keypair includes a private key that is stored in hardware in an onboard computer of the AV. In some examples, the communicating of the request for the device registration certificate includes: extracting unique identifying information about both the device and additional devices in the AV to form the trace data. In various implementations, the session key includes a VIN of the AV to be compared to a list to validate the device before the device is used. Additionally, the device is configured such that session registration occurs on each boot of the device. In various implementations, the device registration request and the session registration request are sent through a designated communication path that restricts Internet access.

In certain implementations involving registration and session management from the perspective a secrets manager, a method for managing a device in an AV is provided and includes receiving a device registration request for the device, wherein the device registration request includes trace data that is unique to the device; communicating a device certificate to authorize registration of the device; receiving a session registration request for the device; evaluating a deny list of compromised vehicles; and communicating a signed session certificate to authorize a session for the device, wherein the signed session certificate includes a session key that is valid for a designated time period.

In various implementations, the method further includes identifying a timestamp associated with session registration request; and determining to authorize the session based on whether the timestamp complies with a configurable time period. In some examples, the method further includes verifying the device registration certificate is valid by checking it against a previously stored certificate; and using the device registration certificate to determine that a provided signature is correct. In some examples, the device registration request and the session registration request are received through a designated communication path that restricts Internet access.

In various implementations, the method further includes communicating an update to firmware stored in a plurality of devices for a plurality of AVs; and rotating one or more session keys to be used for the plurality of devices. In some examples, the method further includes storing a list of VINs in a database; receiving an initial registration request; populating one or more empty fields in the database based on the initial registration request; and signing a certificate associated with the initial registration request.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2B is a combination block diagram and sequence flow illustrating example operations for certificate revocation and management for an AV, according to some embodiments of the disclosure;

FIGS. 2C-2F are generic diagrams illustrating example configurations for certificate revocation and management for an AV, according to some embodiments of the disclosure;

FIGS. 6-7 are diagrams illustrating example formatting for communications involving management services and registration services, according to some embodiments of the disclosure;

DETAILED DESCRIPTION

Overview

Figure 1:
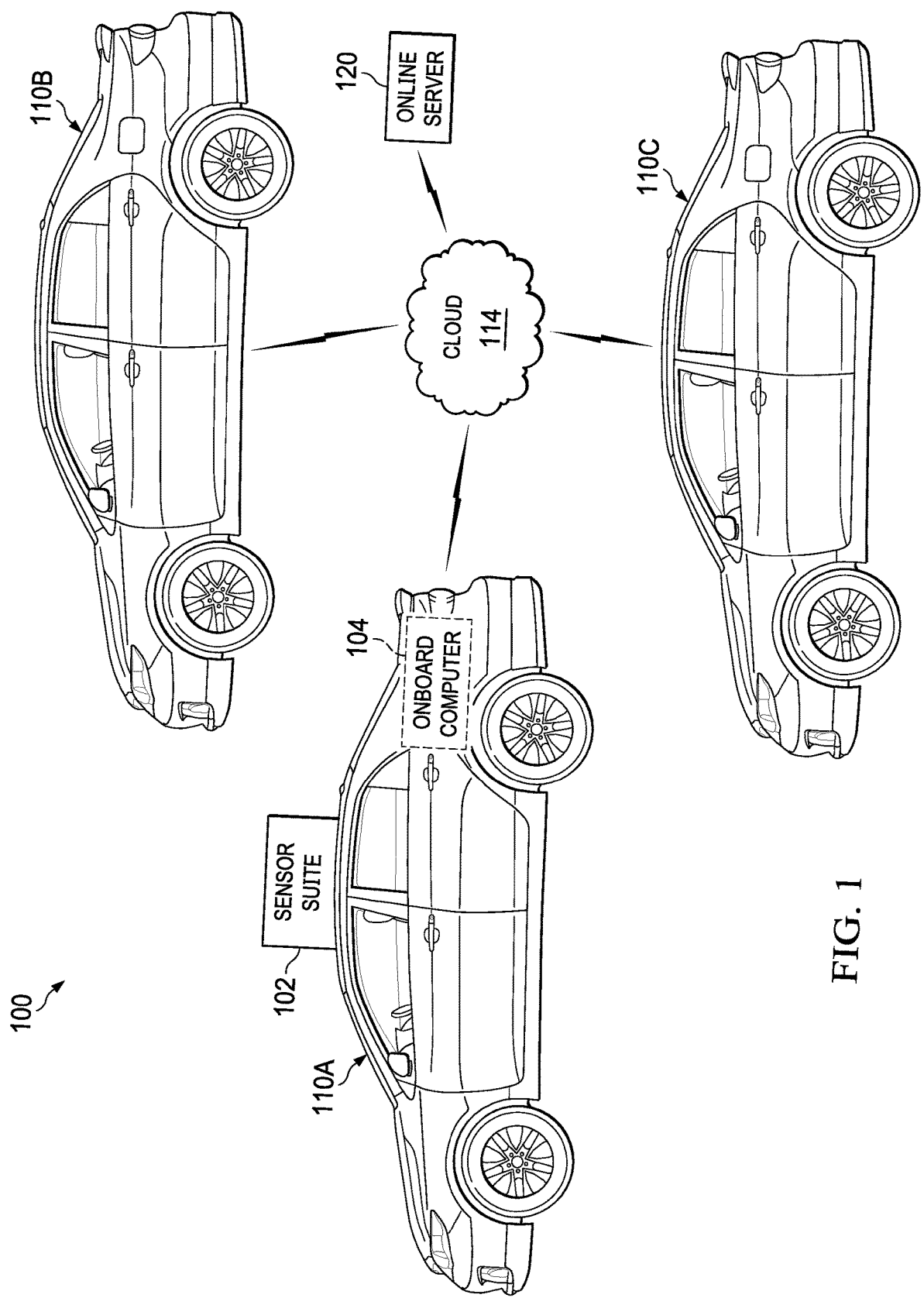
FIG. 1 is a diagram illustrating an AV, according to some embodiments of the disclosure.

Systems and methods are provided for certificate revocation and management for AVs. In particular systems and methods are provided for using a configuration that is based on a unique ID (or group ID) and a lifespan of a corresponding certificate for the unique ID. The lifespan (i.e., its valid time to be operational) can be a fixed value (e.g., 24 hours), but this parameter can easily be configured in different ways based on specific scenarios. Using these two values, the system can express a revocation through the following various configurations. A global revocation list can be used to implement such configurations, as detailed below.

Typically, there are automatically generated certificates provisioned for authentication between services. Services in this context can include any services that run on vehicle devices (inclusive of their components, equipment, etc.) and that communicate to other vehicle devices. This can also include communicating with services running on the backend and interacting with other backend services. Additionally, this could include communications between the vehicle and the backend. In some cases, certificate revocation is based on values stored in the actual certificate that is sought to be revoked. This could force an architecture to track and, thereby, make a copy of every certificate that the system seeks to revoke. As can be appreciated, in robust systems, automatically generated certificates often lead to thousands, or to millions of certificates being generated per day. This number can grow exponentially depending on the scale of the fleet of vehicles being managed. The volume of certificates is such that is not feasible to maintain them for the purpose of revocation. Certain systems with short-lived certificates generally do not implement revocation because they rely purely on a shorter lifespan paradigm.

In example embodiments of the present disclosure, certificates are provisioned to include a unique ID. The system discussed herein can store this unique ID in the certificate common name field (e.g., CN field), although it could be stored in any certificate field (e.g., a subject alternative name (SAN) or it could be spread out over multiple fields). The unique ID can operate as the identifier for the specific service/device.

In one example implementation, the unique ID is partitioned into multiple subparts. The subparts can be hierarchical, familial, random, etc., and allow for any number of groupings. The number of subparts is not limited, as the architecture could have more or fewer depending on particular system needs. In one example case, there are three subparts that make up the uniqueID: 1) VIN; 2) Device_Type; and 3) Device_Identifier. Many of these configuration possibilities, along with example formatting, are detailed below with reference to FIGS. 2B-2F and FIG. 4B.

Additionally, systems and methods are provided for device registration and certificate management for AVs. In particular, systems and methods are provided for allocating certificates with specific time expirations, along with secure device registrations across a fleet of AVs. In general terms, certificates/secrets can be used by many different services and applications. In some instances, applications are deployed from a single location, such as Amazon Web Services (AWS), Google Cloud Platform (GCP), Microsoft Azure, Kubernates, or Digital Ocean, or another cloud service.

In operational scenarios, each device of a given AV should have a certificate (e.g., a cryptographic secret) available for their use. This certificate can be used (intra alia) for authentication purposes in order to securely communicate with other devices or, in some cases, to obtain additional certificates needed for additional operations. Theoretically, these certificates could be burned into specific devices at the time of manufacture (i.e., at the factory). However, this is difficult to do logistically and, further, reliance on this strategy makes it hard to subsequently rotate keys (if that would ever become necessary).

In essence, there is a need to have viable, secure, certificates that show a given device is trusted by the organization managing the fleet of AVs. This further allows the devices to securely identify each other, to communicate with each other, and to communicate with services outside the vehicle. In accordance with example embodiments of the present disclosure, the concept of device registration (DR) is implemented. A number of processes are outlined below to achieve this successful registration result. The first time an AV is powered on (e.g., after arriving at a proprietary ownership location), each of the devices that can do a device registration (e.g., Autonomous Drive System Computer (ADSC), Multi-Carrier Telematics Module (MCTM), High Power Display Controller (HPDC)) would then attempt to get a signed certificate from the proprietary device registration component (e.g., a registration server). Note that MCTM, ADSC, and HPDC simply reference electronic control units (ECUs), as further detailed below.

The encryption of data in communication with the device registration server is via Transport Layer Security (TLS). In addition, instead of burning secrets/certificates at the factory, the devices can obtain the aforementioned certificates at their first boot, according to certain implementations of the present disclosure. The initial request can include any suitable pieces of information about the vehicle, which can collectively be termed "trace data", as used herein. Typically, the DR server would evaluate the request and, subsequently, compare it to the information stored in a database. If the information matches, the DR server can sign the request and the vehicle would have a long-term certificate (effectively signed by the organization affiliated with the fleet of AVs). The system is designed such that the server would not see the private key of the device. Indeed, in certain example implementations of the present disclosure, the private key could be stored in a Trusted Platform Module (TPM) or in a similar hardware mechanism. Note that a certificate can be stored in persistent storage, where its private key is in the TPM. The TPM can be used to sign or to authenticate using the certificate.

If it is the first time the DR server has seen a request from a given autonomous vehicle and, thus, has nothing to compare it to, it can automatically accept it and fill in an entry in a corresponding database. This could operate effectively for those vehicles already set up in a given DR server.

The actual trace data can be chosen in such a way that it can be readily obtained by software running on the autonomous device. In certain example implementations, the trace data is not predictable. This means that if the trace data for one vehicle is discovered, it would not help an Attacker in finding or guessing the trace data for another vehicle. Similarly, the trace data, in certain example embodiments presented herein, would originate from more than one device of the autonomous vehicle. Therefore, if a single device would be stolen from an autonomous vehicle, it would not contain enough information to do a new device registration, even for that single device.

In operation, consider the general case in which a device seeks a valid device registration certificate to perform one or more computing functions for the AV. The device can generate a public/private keypair, as well as a CSR that is based on the aforementioned keypair. The device can store the private key in any suitable storage location. In one implementation, the private key can be stored in secure hardware (e.g., a TPM). The device can then extract unique identifying information about itself and other devices in the AV to form the trace data. The device can subsequently bundle up the CSR, along with the trace data, and send it to a DR service (e.g., a server). The DR server can then validate the trace data and return a signed certificate to the device.

Once successful, the device can use this signed certificate to authenticate to other devices and services. In one particular example, on each boot of the device, the device will obtain session keys from a secret service (e.g., a server that can operate as a 'vault' of sorts). Obtaining these session keys can be done either directly or indirectly through a proxy service by providing a device registration certificate. In general terms, any one or more of these activities can collectively be referred to as "session registration" being performed for a given device or, more generally, for the AV itself. The broad term "device" in any of the contexts and scenarios discussed throughout this Specification is inclusive of any component, module, electronic part, or element that is coupled to, provided in, or otherwise proximate to an autonomous vehicle.

Example Autonomous Vehicle Configured for Certificate Revocation and Management

FIG. 1 is a diagram 100 illustrating a set of AVs 110A-C, according to some embodiments of the disclosure. The autonomous vehicle 110A includes a sensor suite 102 and an onboard computer 104 in this example. A number of peer AVs are also illustrated in FIG. 1, referenced as autonomous vehicles 110B and 110C, which could constitute a fleet being provisioning by a single organization. In the example of FIG. 1, a cloud 114 is illustrated as having connectivity with the fleet of AVs 110A-C and an online server 120.

The cloud 114 supports communications between the AVs 110A-C and the online server 120. The cloud 114 may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the cloud 114 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all, or some of the communication links of the cloud 114 may be encrypted using any suitable technique or techniques.

The online server 120 may manage a service that provides or uses the AVs 110A-C (e.g., a service for providing rides to users with the AVs 110A-C) or a service that delivers items (e.g., prepared foods, groceries, packages, etc.) using the AVs 110A-C. The online server 120 may select an AV from a fleet of AVs 110A-C to perform a particular service or other task and instruct the selected AV 110A to autonomously drive to a particular location (e.g., a delivery address). The online server 120 also manages maintenance tasks, such as charging and servicing of the AVs 110A-C.

In some embodiments, the online server 120 may also provide the AV 110A (and particularly, onboard computer 104) with system backend functions. The online server 120 may include one or more switches, servers, databases, live advisors, or an automated voice response system (VRS). The online server 120 may include any or all the aforementioned components, which may be coupled to one another via a wired or wireless local area network (LAN). The online server 120 can receive and transmit data via one or more appropriate devices and, further, communicate over any suitable network to the AV fleet. This can include using any appropriate wireless systems, such as 882.11x, GPRS, and the like. A database at the online server 120 can store account information such as subscriber authentication information, vehicle identifiers, profile records, behavioral patterns, and other pertinent subscriber information. The online server 120 may also include a database of roads, routes, locations, etc. permitted for use by AV 110A. The online server 120 may communicate with the AV 110A to provide route guidance in response to a request received from the vehicle.

For example, based upon information stored in a mapping system of the online server 120, the online server 120 may determine the conditions of various roads or portions thereof. Autonomous vehicles, such as the AV 110A, may, in the course of determining a navigation route, receive instructions from the online server 120 regarding which roads or portions thereof, if any, are appropriate for use under certain circumstances, as described herein. Such instructions may be based in part on information received from the AV 110A or other autonomous vehicles regarding road conditions. Accordingly, online server 120 may receive information regarding the roads/routes generally in real-time from one or more vehicles. Online server may include The online server 120 includes an electronic platform that may, for example, be a hardware platform such as the one illustrated and described below with reference to FIG. 9. The example hardware platform provides the hardware and/or software infrastructure for the online server 120 to perform its designated functions. In this illustrative example, those designated functions may include control logic, non-volatile key storage, volatile key storage, a registration module, and a session module. The hardware platform may also include or provide a network stack. In addition to the appropriate hardware interfaces, the network interface may also provide appropriate software and/or firmware interfaces, such as the various layers of popular seven-layer network protocols. The network interface may include one or more physical interfaces and/or one or more logical interfaces. For example, the network interface may communicatively couple the online server 120 to a plurality of devices on the AV, such as via a CAN bus or similar vehicle bus. The network interface may also communicatively couple the online server 120 to an external network, such as the Internet. This may be via a wireless or cellular network or via a temporary hardwired network that is used to communicate with the online server 120.

The control logic may include one or more hardware and/or software engines that may enable the online server 120 to make and execute decisions for the autonomous vehicle. For example, the control logic may collect position, road condition, obstruction, and traffic data and, based on those data, may determine a speed, direction, and other inputs for the AV. The control logic may also include interfaces or APIs to conduct those control decisions, such as by actuating various actuators.

In various examples, the onboard computer 104 includes a registration module and a session module (as illustrated and described below with reference to FIG. 2A). These elements can coordinate to receive certificates and to distribute the certificates to the appropriate services in the autonomous vehicle 110A. This would involve communications with the online server 120, which could assist in both session service and registration service, as detailed more fully below. In one example embodiment, the online server 120 includes (or at least maintains a logical communication pathway to) a registration service, a session service, a device certificate authority, a session certificate authority, a certificate revocation service, a device registration authority, and/or a vehicle module database to achieve the certificate revocation activities outlined herein.

Both onboard computer 104 and the online server 120 can include any suitable combination of hardware or software to achieve the device registration, the certificate revocation, and/or the management operations discussed herein. This would include any hardware or software implementations that provide for any one or more of the following elements of the architecture: the registration module, the session module, the registration service, the session service, the device certificate authority, the session certificate authority, the certificate revocation service, the device registration authority, and the vehicle module database, as fully detailed below. In various implementations, the autonomous vehicle 110A uses sensor information from the sensor suite 102 to determine its location, to navigate traffic, and to sense and avoid various obstacles. In various examples, the sensor suite 102 includes one or more services or applications that use secrets acquired by the registration module and the session module.

The sensor suite 102 includes localization and driving sensors. For example, the sensor suite may include one or more of photodetectors, cameras, radio detection and ranging (RADAR), SONAR, light detection and ranging (LIDAR), GPS, inertial measurement units (IMUs), accelerometers, microphones, strain gauges, pressure monitors, barometers, thermometers, altimeters, wheel speed sensors, and a computer vision system. In various example implementations, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view. In various examples, the onboard computer 104 includes registration module and session module, and the registration module and session module communicate with a cloud-based management service to retrieve secrets/certificates used by the autonomous vehicle.

The autonomous vehicle 110A includes an onboard computer 104, which functions to control the autonomous vehicle 110A. The onboard computer 104 processes sensed data from the sensor suite 102 and/or other sensors, in order to determine a state of the autonomous vehicle 110A. In some implementations described herein, the autonomous vehicle 110A includes sensors inside the vehicle. Based upon the vehicle state and programmed instructions, the onboard computer 104 controls and/or modifies driving behavior of the autonomous vehicle 110A.

The onboard computer 104 functions to control the operations and functionality of the AVs 110A and processes sensed data from the sensor suite 102 and/or other sensors in order to determine states of the AVs. The onboard computer 104 may receive injections and distribute the secrets/certificates to appropriate services. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by AVs.

An AV 110A may also include a rechargeable battery that powers the AV 110A. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the 110A is a hybrid electric vehicle that also includes an internal combustion engine for powering the 110A, e.g., when the battery has low charge. In some embodiments, the 110A includes multiple batteries, e.g., a first battery used to power vehicle propulsion, and a second battery used to power AV hardware (e.g., the onboard sensor suite and the onboard controller). The 110A may further include components for charging the battery, e.g., a charge port configured to make an electrical connection between the battery and a charging station.

According to various implementations, the autonomous driving system of FIG. 1 functions to enable an autonomous vehicle 110A to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110A is preferably a fully autonomous automobile, but may additionally or alternatively be any semi-autonomous or fully autonomous vehicle. In various examples, the autonomous vehicle 110A is a boat, an unmanned aerial vehicle, a driverless car, a golf cart, a truck, a van, a recreational vehicle, a train, a tram, a three-wheeled vehicle, or a scooter. Additionally, or alternatively, the AVs may be vehicles that switch between a semi-autonomous state and a fully autonomous state and thus, some AVs may have attributes of both a semi-autonomous vehicle and a fully autonomous vehicle depending on the state of the vehicle.

In various implementations, the autonomous vehicle 110A includes a throttle interface that controls an engine throttle, motor speed (e.g., rotational speed of electric motor), or any other movement-enabling mechanism. In various implementations, the autonomous vehicle 110A includes a brake interface that controls brakes of the autonomous vehicle 110A and controls any other movement-retarding mechanism of the autonomous vehicle 110A. In various implementations, the autonomous vehicle 110A includes a steering interface that controls steering of the autonomous vehicle 110A. In one example, the steering interface changes the angle of wheels of the autonomous vehicle. The autonomous vehicle 110A may additionally or alternatively include interfaces for control of any other vehicle functions, for example, windshield wipers, headlights, turn indicators, air conditioning, etc.

Example Registration and Session Management Method Involving an Attacker

Figure 2A:
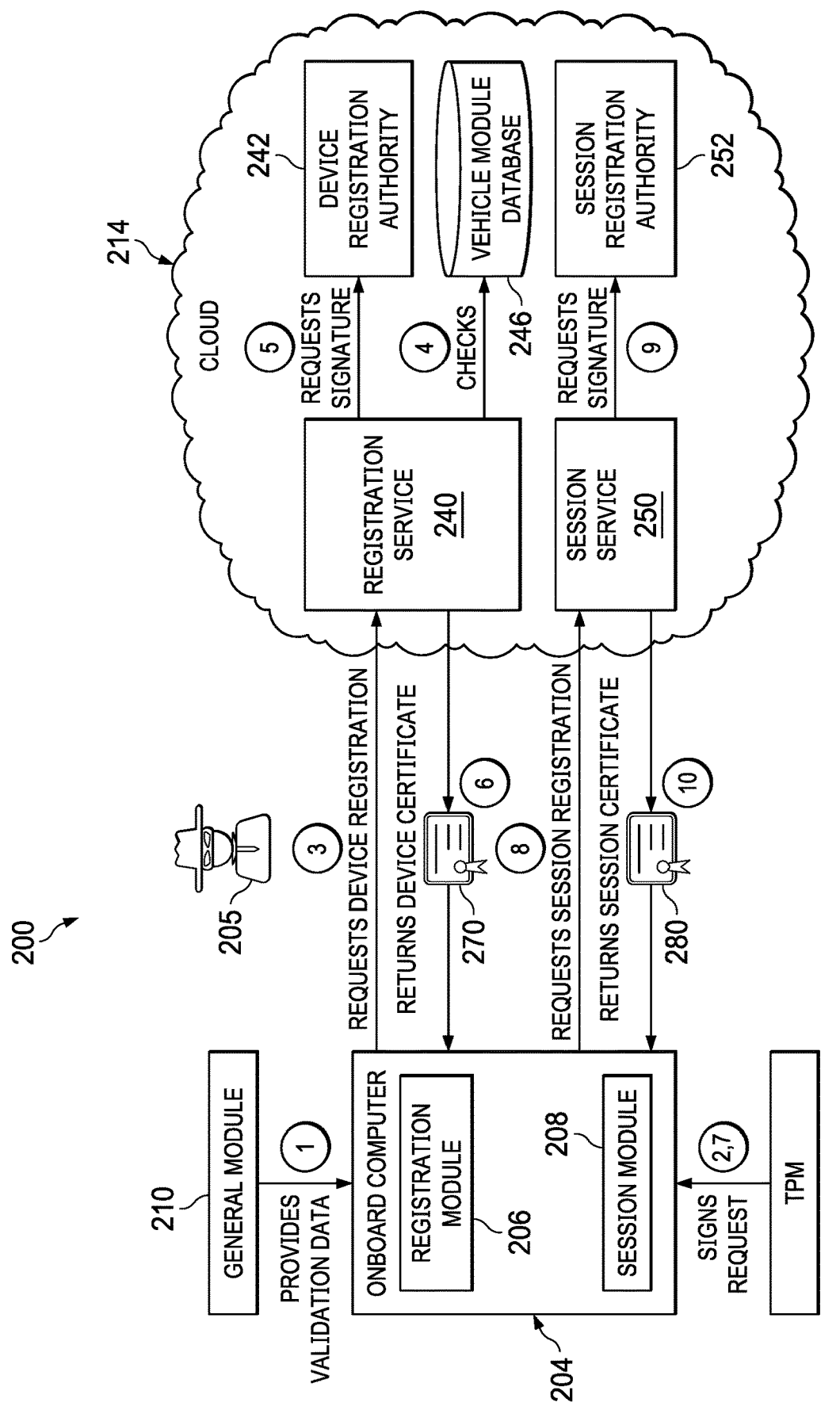
FIG. 2A is a combination block diagram and sequence flow illustrating example operations for device registration and management for an AV, according to some embodiments of the disclosure.

FIG. 2A is both a diagram and a sequence flow 200 illustrating a registration and session management method involving an Attacker 205, according to an example embodiment of the invention. FIG. 2A includes a registration module 206 and a session module 208 that are provisioned in an onboard computer 204 in this example. Also depicted in FIG. 2A is a cloud 214 that includes a device registration service 240, a device registration authority 242, a vehicle module database 246, a session service 250, and a session registration authority 252.

In general, for a 'Threat Model' scenario, an Attacker 205 may be present, either remotely or with direct physical access (i.e., holding a device, sitting in the AV itself, etc.). The Attacker 205 may obtain unauthorized access to a device in any number of nefarious ways. This access would give the Attacker 205 access to the trace data and the algorithm being used for collection. It could also give the Attacker 205 access to the device registration certificate and/or the session keys. In certain cases, the Attacker 205 could have the ability to use the private key that corresponds to the device registration key, but the Attacker 205 will not have access to this directly because it would be stored in secure hardware, as described below.

While on the device, in theory, the Attacker 205 could use the device registration certificate to get new session keys. The Attacker 205 can use the session keys to do whatever session keys are being used for in the vehicle. For example, the Attacker 205 could perform mutual TLS with other devices.

Alternatively, the Attacker 205 could impersonate other services. In essence, as long as the Attacker 205 has gained entry onto the device, the Attacker 205 would theoretically have the same level of access as an authorized user of the device. However, one interesting aspect to this violation is considering what could happen once the Attacker 205 no longer has direct access. Further, in this scenario, it is valuable to understand what this access means toward compromising certificates on other vehicles (i.e., peer AVs in the fleet).

There are several possible scenarios after the unlawful access is obtained. First, the Attacker 205 may physically steal the device, the AV itself, or any other surrounding equipment. In this case, the Attacker 205 will still have access to (use of) the device registration private key and the certificate. The Attacker has access to the existing session keys. If no changes are made within an organization's infrastructure, and if the Attacker noted the trace data, the Attacker 205 can continue to obtain new session keys. In accordance with embodiments of the present invention, and as demonstrated in the sequence flow of FIG. 2A, steps can be taken to limit the damage in this security breach once there is a recognition that the device is no longer under authorized control.

Turning to the sequence of FIG. 2A, the process begins at part 1 where validation data is exchanged between the onboard computer 204 and any suitable credentials interface (e.g., a general module 210). This could be log-in data or even more simply accessing a network connection. At part 2, a given device makes a request for a device registration certificate. The device can generate a public/private keypair, as well as a CSR based on the keypair. The devices can store the private key in secure hardware, when possible, such as a TPM. At part 3, the device (or even more generally, the AV) can request a device registration. The device would extract unique identifying information about itself and other devices in the AV, which can form the trace data. It then bundles up the CSR along with the trace data and sends it to the device registration service 240 (e.g., online server). Note that the communication with the DR service is encrypted in order to not expose the trace data. The device registration service 240 can perform checks with the vehicle module database 246 and request a signature from the device registration authority 242. This is shown in parts 4 and 5.

At part 6, the device registration service 240 returns the device certificate 270 to the onboard computer 204. The request is signed at part 7 and, subsequently, the onboard computer 204 sends the session registration request in part 8. The session service 250 requests the signature at part 9 and this can involve interacting with the session registration authority 252. The result of this activity allows the session service 250 to send the session certificate 280 back to the onboard computer 204.

More specific to the security design possibilities for device registration, embodiments of the present disclosure seek to address the following security objectives: 1) communication being carried out over verified TLS connections; 2) session keys being valid for a shorter period of time (e.g., less than one day); 3) session keys being valid for the vehicle for which they were generated; 4) if a vehicle is compromised, new session keys being prevented from being obtained; 5) a device outside the vehicle not being able to perform device registration; and 6) knowing the secrets/certificates from one vehicle not helping to discover the secrets/certificates from another vehicle (nor does it compromise another vehicle's security in any additional ways).

One or more of these security goals can be achieved in example embodiments presented herein by any one of the following mechanisms. First, session keys can be signed by a secrets manager (operating as a form of a vault) and only being valid for a shortened time period (e.g., 60 seconds, 1 hour, 24 hours, etc.). Second, before signing session keys, the secrets manager references a deny list of compromised vehicles and chooses not to sign session keys for a compromised vehicle on the list. Third, the trace data is obtained and constructed in such a way that knowing the trace data from one vehicle does not help to infer (or otherwise decode) the trace data of another vehicle. Fourth, trace data originates from not only the device itself, but from other devices in the vehicle. Fifth, the session keys can contain the VIN of the vehicle, and this can be checked before validating them by devices within the vehicle.

FIG. 2B is both a diagram and a sequence flow illustrating an example certificate revocation and device management method, according to an example embodiment of the invention. This particular flow begins at part 1 where validation data is exchanged between the onboard computer 204 and any suitable credentials interface (e.g., the general module 210). This could be log-in data or even more simply accessing a network connection. A given device then makes a request for a device registration certificate. The device can generate a public/private keypair, as well as a CSR based on the keypair. The device can store the private key in secure hardware, when possible, such as a TPM. The CSR is signed at part 2, as is illustrated.

At part 3, the device (or even more generally, the AV) requests a device registration. The device can extract unique identifying information about itself and other devices in the AV in order to form the trace data. It then bundles the CSR with the trace data and sends it to the device registration service 240 (e.g., a server). The device registration service 240 can perform various checks (e.g., interacting with the vehicle module database 246) and request a signature from the device registration authority. Hence, the public key and the validation data is validated at part 4. At part 5, the certificate revocation service 284 is queried to determine if the CN of the CSR has been blocked. The CSR is subsequently signed at part 6, and this involves the device certificate authority 278. A signed certificate is returned, and a certificate is provided at steps 7-8.

Subsequently, at part 9, the onboard computer 204 sends the session registration request to the session service 250. At part 10, an evaluation is made as to whether the DR certificate is valid. If it is valid, then the certificate would be signed. If it were not valid, then the CN of the DR certificate could be effectively blocked, as shown in part 11. This analysis as to whether to block the CN of the DR cert can involve the certificate revocation service 284 evaluating one or more internal lists that it maintains. The session certificate authority 282 can be engaged to sign the certificate at part 12. The signed certificate is provided at part 13 and subsequently sent back to the general module 210 at part 14.

In operation of an example flow for additional illustrative purposes, consider a revocation intended for Car #1. For example, the system may seek to revoke the certificate for Car #1 because it was stolen, lost, vandalized, or otherwise compromised. The system can revoke 5G000000001 in the long-lived certificate system, preventing new short-lived certificates from being generated or "minted." The broad term "generated" includes any type of producing, publishing, minting, constructing, manufacturing, supplying, or otherwise creating. For this example, this revocation is accomplished through the following configuration: VIN=5G000000001 newer than 01-01-2035:23:59:59. This indicates that any long-lived certificate that has the group of VIN=5G000000001 in its unique ID should present a certificate that is valid starting after 01-01-2035:23:59:59. Additionally, the system revokes 5G000000001 in the short-lived certificate system, which prevents any short-lived certificates from authenticating to this compromised vehicle. This can be achieved through the following configuration: VIN=5G000000001 newer than 01-02-2021:23:59:59.

Now there is one entry in each revocation instance provided in a list (e.g., stored in a table, a memory, a database, etc.). For optimization purposes, the system can remove the revocation information from the short-lived system once it can confirm that all short-lived certificates associated with that unique ID or that group have expired. A timeout can be set based on the timestamp for when the system revoked the unique ID in the long-lived system plus the maximum validity (24 hours in one example scenario). As detailed herein, this process can be done for a unique ID or for a group (as shown above). It should be noted that this illustrated framework scales well and it has exceptional performance because the revocation lists can be reduced in size overtime. This provides the added benefit of having a faster lookup (e.g., searching a relatively short list of revoked IDs).

In one example implementation, the long-lived and short-lived certificates are based on different root certificates. Basically, the system can rely on one revocation list of each root certificate that is used in a system. The system could have more or fewer fields in the unique ID. More fields include greater abilities for grouping and, therefore, more flexibility and more scalability.

The architecture can also allow for "un-revoking." This allows the system to be able to easily reenable a device/service if the system determines it was revoked in error, the device in question was recovered (in the case of a stolen car being returned), or the exception (i.e., the revocation) no longer applies. This un-revoking procedure can be based on updating the revocation list and it would not require modifying the device/service. Hence, the system can systematically perform revocations based on a unique ID, a group member, and/or a timestamp. This further allows the system to do blanket revocations based on timestamps, irrespective of the unique ID or the group membership data. The revocation list can be queried in any suitable fashion (e.g., a proprietary mechanism, an API call over a network connection, etc.). The system can synchronize the revocation list to all users at any suitable time interval (e.g., periodically or based on updates, etc.). Due to the small size of the revocation list, this synchronizing activity is actually feasible with relatively low overhead.

FIGS. 2C-2F are generic diagrams 290, 292, 294, and 296 illustrating example configurations for certificate creation, revocation, and management for an AV, according to some embodiments of the disclosure. In one example implementation, the unique ID is partitioned into multiple subparts. There is significant design flexibility for these subparts, as they can be affiliated in any suitable manner. For example, the subparts can be hierarchical, based on device type based on a specific protocol, and allow for any number of groupings. The number of subparts is not limited, as the architecture could have more or fewer depending on particular system needs and configurations. In one non-limiting example, there are three subparts that make up the uniqueID and they include the VIN, the Device Type, and the Device Identifier, as shown in FIG. 2C.

In the embodiment of FIG. 2C, a unique ID is provided for two Certificates (#1, #2) as follows:
Unique ID Example
  Certificate #1:
  ADSCA_VIN_5G00000000001
  ADSC=Device_Type
    A=Device_Identifier
    VIN_5G00000000001=VIN
  Certificate #2:
  MCTM_VIN_5G00000000001
  MCTM=Device_Type
    =(No Device_Identifier)
    VIN 5G00000000001=VIN In the embodiment of FIG. 2D, a certificate creation process involving Car #1 and Car #2 is provided. Similar to what was described above, the certificate includes a VIN and a validity time interval. This is illustrated as follows:
Car #1 (domainA):
  Unique ID: ADSCA_VIN_5G000000001
  valid from: 01-01-2021:00:00:00-01-01-2021:23:59:59
  Unique ID: MCTM_VIN_5G000000001
  valid from: 01-01-2021:00:00:00-01-01-2021:23:59:59
Car #2 (domainB):
  Unique ID: ADSCA_VIN 5G000000002
  valid from: 01-01-2021:00:00:00-01-01-2021:23:59:59
    Unique ID: MCTM_VIN_5G000000002
  valid from: 01-01-2021:00:00:00-01-01-2021:23:59:59

In the embodiment of FIG. 2E, a certificate revocation process involving Car #1 and Car #2 is illustrated. In a first example, the system seeks to revoke all certificates of Car #1. To achieve this, in this example scenario, the system can provide the following configuration:
  VIN=5G000000001 newer than 01-01-2021:23:59:59.

This configuration means that each certificate containing the specific VIN is now effectively revoked. This directive is independent of how many certificates are associated with the given VIN (subpart of the unique ID). In a second example, the system seeks to revoke ADSCA from Car #2, so the system can provide the following configuration:
  UID=ADSCA_VIN_5G000000002 newer than 01-01-2021:23:59:59. This means the specific certificate with unique ID (ADSCA_VIN_5G000000002) has been successfully revoked.

For the embodiment of FIG. 2F, a long-term certificate creation process involving Car #1 and Car #2 is provided as follows. In this scenario, it should be noted that there is a longer valid from-to range (i.e., multiple years). The configuration would be as follows:
Car #1 (domainA):
  Unique ID: ADSCA_VIN_5G000000001
  valid from: 01-01-2021:00:00:00-01-01-2035:23:59:59
  Unique ID: MCTM_VIN_5G000000001
  valid from: 01-01-2021:00:00:00-01-01-2035:23:59:59
Car #2 (domainB):
  Unique ID: ADSCA_VIN_5G000000002
  valid from: 01-01-2021:00:00:00-01-01-2035:23:59:59
    Unique ID: MCTM_VIN_5G000000002
  valid from: 01-01-2021:00:00:00-01-01-2035:23:59:59

Figure 3:
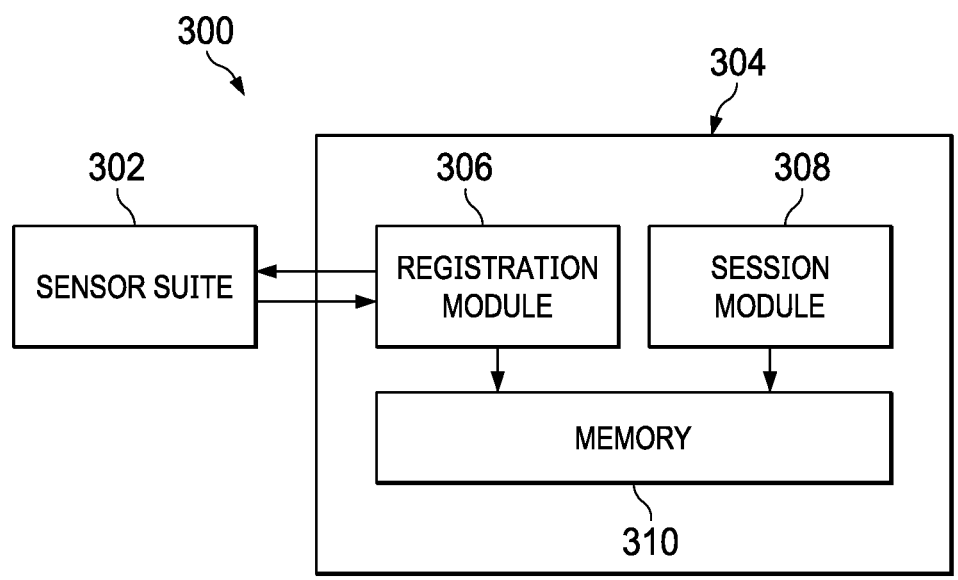
FIG. 3 is a diagram illustrating a registration module and a session module, according to some embodiments of the disclosure.

Continuing with this example, the short-term certificate creation involving Car #1 and Car #2 would be provided as follows. (Note: the valid from-to range is 24 hours in this particular instance).
Car #1 (domainA):
  Unique ID: ADSCA_VIN_5G000000001
  valid from: 01-01-2021:00:00:00-01-01-2035:23:59:59
  Unique ID: MCTM_VIN_5G000000001
  valid from: 01-01-2021:00:00:00-01-01-2035:23:59:59
Car #2 (domainB):
  Unique ID: ADSCA_VIN_5G000000002
  valid from: 01-01-2021:00:00:00-01-01-2035:23:59:59
    Unique ID: MCTM_VIN_5G000000002
  valid from: 01-01-2021:00:00:00-01-01-2035:23:59:59
Example Registration and Session Activities Turning to FIG. 3, FIG. 3 is a diagram 300 illustrating a sensor suite module 302 and a container 304 including a registration module 306, a session module 308, and a memory 310, according to various embodiments of the disclosure. As described above, the registration module 306 and session module 308 send an authorization credential to the sensor suite module 302. The sensor suite module 302 transmits the authorized secrets to the registration module 306 and session module 308. The registration module 306 and session module 308 transfers one or more of the received secrets to memory 310, where one or more applications that uses the secret can retrieve the secret. According to various examples, memory 310 is the location where the application(s) in the application container expects to find its secrets. In some examples, the container 304 includes multiple application containers.

In various implementations, the sensor suite module 302 is a cloud-based service. In some implementations, the sensor suite module 302 includes a database for storing secrets. In some implementations, the sensor suite module 302 includes a data storage module. The sensor suite module 302 accesses the database to retrieve secrets for the registration module 306 and session module 308. According to various implementations, the sensor suite module 302 and the registration module 306 and session module 308 transmit and receive communications wirelessly. According to various implementations, the container 304 is in an autonomous vehicle. In some examples, the container 304 is in the onboard computer of an autonomous vehicle. During a deployment process for the autonomous vehicle, the registration module 306 and session module 308 is provided to the autonomous vehicle.

During vehicle initiation, the autonomous vehicle has acquired a credential from the secrets management service. In one example, an autonomous vehicle undergoes a registration process before initiation, and the autonomous vehicle acquires the credential during one of these processes. In some examples, secrets reside in various storage locations on the autonomous vehicle. In some examples, the secrets reside in one or more memory addresses or databases. In various examples, the secrets reside in volatile (or non-persistent) storage locations. Volatile storage is generally ephemeral and expires regularly. In some examples, volatile storage expires at initiation of a vehicle, and in some examples, volatile storage expires when a vehicle is turned off and/or at regular intervals (e.g., hourly, daily). Some volatile storage locations expire when the vehicle completes a task, such as when the vehicle completes a route. In some examples, the secrets reside at various locations in the onboard computer of the autonomous vehicle.

Figure 4A:
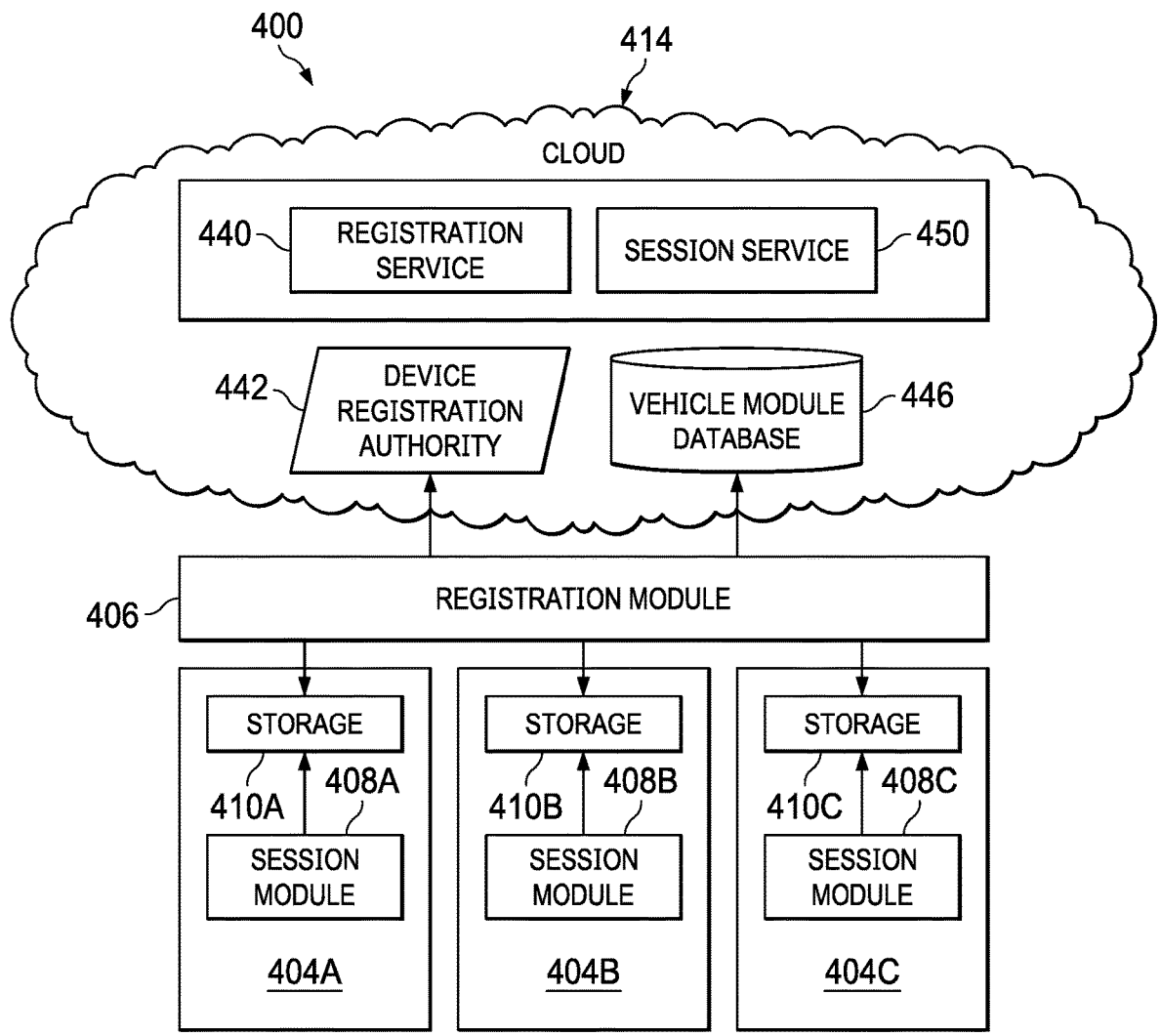
FIG. 4A is a diagram illustrating a management service and registration service for multiple AVs, according to some embodiments of the disclosure.

FIG. 4A is a diagram 400 illustrating a fleet of AVs interacting with a registration service 440, a session service 450, a device registration authority 442, and a vehicle module database 446 over a cloud 414 connection. Multiple session modules 408A-C are provided for each respective onboard computer 404A-C. Also provided are various storage (memory) locations 410A-C within onboard computers 404A-C according to various implementations of the disclosure. The registration module 406 can be a centralized tool that manages secrets for multiple containers of the onboard computers 404A-C. Individual instantiations of the registration module 406 could be readily provided within each onboard computer 404A-C.

According to some implementations, the secrets would be stored in a centralized secrets management service location such as a database. One implementation of a database is described below with reference to FIG. 8. The secrets management service can solve the secrets provisioning difficulties in a cloud-agnostic way. In particular, a central secrets management service allows for creation of consistent patterns for storing secrets and authenticating identities. According to various examples, the patterns remain about the same regardless of the cloud ecosystem the services are deployed into. This is accomplished by selected methods of delegating secrets paths in the central secrets store. In various examples, each autonomous vehicle in a fleet communicates with the secrets management service to access secrets specific to the respective autonomous vehicle.

Various secrets for an autonomous vehicle can be stored in many different locations. In various implementations, the selected location for secrets storage depends on what applications and services need the secrets and where those applications and services are running. While in some examples, secrets are stored in source code or in build artifacts, source code and build artifacts may not be the most secure locations since they can potentially be accessed by users. Furthermore, source code and artifacts can be reused in multiple environments. Other locations for secrets storage are volatile storage locations. Volatile storage is storage that expires regularly, such as each time an autonomous vehicle is turned off, each time an autonomous vehicle completes a route, or at regular intervals (e.g., hourly, daily, etc.).

Figure 4B:
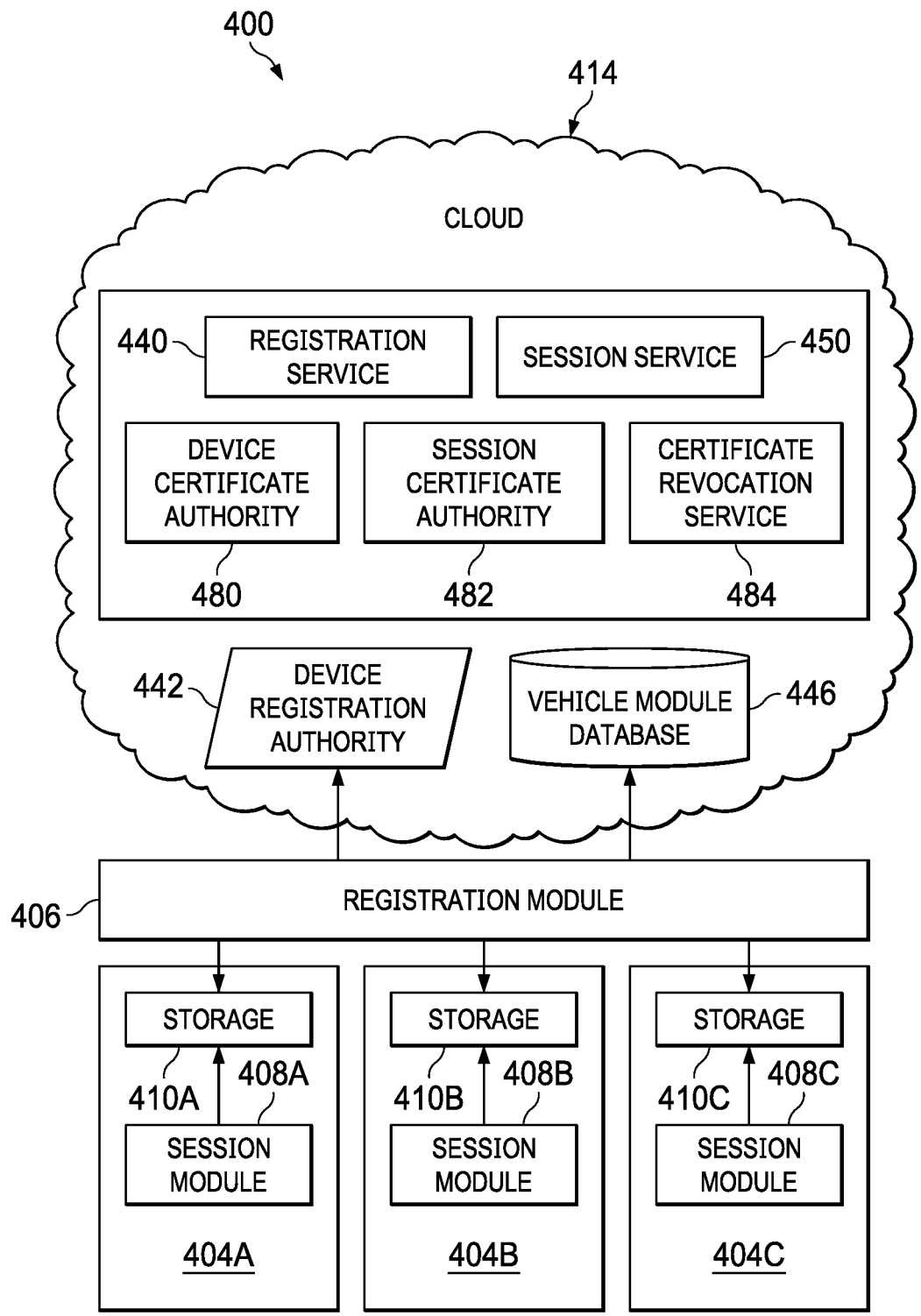
FIG. 4B is a diagram illustrating a certificate revocation and management service for multiple AVs, according to some embodiments of the disclosure.

In various examples, one or more of the secrets can exist for the lifetime of the service. In some examples, one or more of the secrets exist for the period during which the vehicle is running, and the secrets expire when the vehicle is turned off. In other examples, the secrets expire at regular intervals or preconfigured intervals (e.g., daily, 24 hours, hourly). In some examples, as shown in FIGS. 4A-B, one or more of the storage locations 410A-C are part of onboard computers 404A-C and secrets expire within 24 hours of being issued. In operation, once the registration module 406 and session modules 408A-C have acquired secrets, each service running on the autonomous vehicle can acquire their respective secrets.

FIG. 4B is another potential embodiment for certificate creation and revocation in accordance with the teachings of the present disclosure. In one non-limiting way, the embodiment of FIG. 4B can be viewed as an extension of the previous interactions involving the registration and session management activities of FIG. 4A. The architecture of FIG. 4B includes a device certificate authority 480, a session certificate authority 482, and a certificate revocation service 484.

In operation of an example deployment, consider the architecture of FIG. 4B relying on a global revocation list, which can be stored in any suitable database, server, etc. The global revocation list can be consulted (queried) each time one of the certificates is used for authentication. While this activity seems like it may become slow rather quickly, in fact it does achieve superior performance because the system scales to the number of unique IDs. This is in contrast to scaling with the actual number of certificates and, hence, the revocation list of the present disclosure will remain relatively small. This further allows for faster lookups, which increases system performance. Furthermore, only revoked unique IDs would appear in the revocation list. In a system with short-lived certificates, there is a service that mints new certificates (e.g., every 24 hours a device/service gets a new certificate that is valid for 24 hours). Once a unique ID or group of unique IDs is revoked, the system can block the issuance of new certificates for the given unique ID. Indeed, in example embodiments, such blocking activities could happen first.

The process for minting short-lived certificates can be based on longer-lived certificates. This can mean that each service authenticates using a longer-lived certificate. In one example case, the longer-lived certificates have the same unique ID as the short-lived certificates. Therefore, the system can apply the same paradigm for revocation for the longer lasting certificates.

Figure 5:
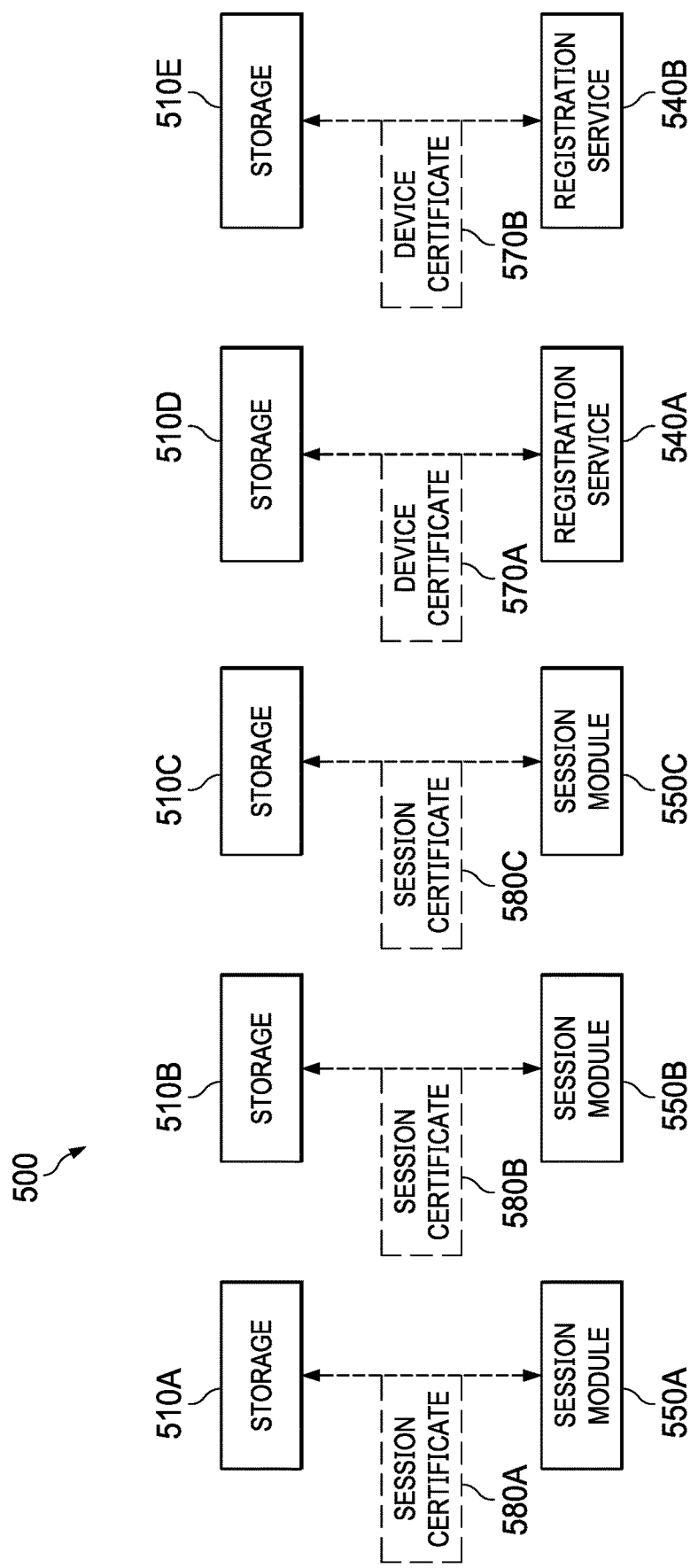
FIG. 5 is a diagram illustrating a management service and registration service activities involving storage for several AVs, according to some embodiments of the disclosure.

FIG. 5 is a diagram 500 illustrating communication between the storage locations 510A-E, session certificates 580A-C, device certificates 570A-B, session modules 550A-C, and registration services 540A-B, according to some embodiments of the disclosure. The session modules 550A-C and the registration services 540A-B are running on an autonomous vehicle. In operation of an example flow involving device registration, servers can be maintained or hosted by any suitable entity. Each device can utilize its respective storage 510A-E to store and otherwise maintain a shared secret, a proprietary certificate, and a URL identifying the location of the device registration server. In one non-limiting example, these items are contained in appropriate firmware. One alternative to this is the MCTM format, which can receive the location from a provisioning server. The shared secret can be the same on all devices on all vehicles in some example scenarios of the present disclosure.

In and of itself, this shared secret provides security against an Attacker who has never had access to the internals of any AV, or its devices. However, in certain situations, this offers a minimal security effect for the device registration server because the device registration server is Internet accessible. This may be necessary because, when using it, the devices would not have a viable way to complete their authentication to an IPsec server, a virtual private network (VPN) server, etc. For example, on first boot of the onboard computer, or if the device registration certificate is lost (or it expires, or it is otherwise invalid, etc.), the onboard computer can utilize its respective registration service 540A-B to begin the device registration process. This includes initiating the collection of trace data. This trace data can be a collection of unique device and environment data that serves as authentication data for the request. This may include things such as serial numbers, MAC addresses, or any other suitable identification data where appropriate and based on particular needs.

After obtaining the trace data, the onboard computer generates a public/private keypair. This private key can be securely stored in hardware, or in any other suitable location. In the case of ADSC, this can be provisioned in a TPM for example. For the HPDC and the MCTM scenarios, this could be stored in an ARM TrustZone. (Note that a number of example formats for such provisioning are provided below with reference to FIGS. 6-7.) The onboard computer can subsequently create a CSR from the public key that includes the VIN of the vehicle and the device type in the common name field (e.g., AV_ADSCA_VIN_XXXXXX).

The onboard computer then constructs a request that includes the trace data, the CSR, and other suitable identifying fields. The onboard computer can use the request, process a JavaScript Object Notation (JSON) Web Token (JWT) with the shared secret, and then send the request to the device registration server. The request can be sent over a TLS connection. The certificate presented by the device registration server can be signed by a pre-loaded proprietary certificate available in the device. The device registration service can use a 'trust on first use' model, where the server only begins with a list of vehicle VINs. The initial time a particular device seeks to register, it presents the CSR along with the VIN and other authentication fields. The registration service can populate the empty fields in the database and sign the certificate. Subsequent requests to sign a CSR for that device for that particular VIN would be rejected unless each field of the request, including the public key in the CSR, matches. This is to prevent malicious devices from registering 'over' a valid registration, while allowing registration with the same key, in order to extend the validity time. It should be noted that the CSR itself can be validated against the existing the public key.

In the context of an example Attacker scenario, the Attacker could potentially have short-term access to a device but subsequently lose that access. In such a case, the Attacker may have the session keys but no longer have access to use the device registration private key. This could mean he can no longer get new session keys, for example. Since session keys are configured to be valid for a finite time (e.g., 24 hours), these keys will quickly become worthless.

In example embodiment of the present disclosure, the actual timing of device registration can occur the first time the device in question can initiate contact with the Internet. Session registration can take place on each boot, and it would work each time the vehicle has a connection to a proprietary server (e.g., a Backoffice) either through Wi-Fi, IPSEC tunnels, etc. Storage of device registration private key can be protected in any suitable manner. In the ADSC example, it can be stored in a TPM, in the HPDC example, it can be stored in the Android Keystore, in the MCTM example, it can be stored in ARM TrustZone. Ideally, although not universally, the key can be stored in some form of hardware in such a way that it can be used but it cannot be extracted.

With respect to the trace data, in order to authenticate to the device registration server, the AV can collect information about itself and its environment. This information may include, for example, things such as hard drive serial number, CPUID, MAC address, board serial number, International Mobile Equipment Identity (IMEI), information from nearby devices such as sensors, or any other suitable data. Ideally, the trace data is constructed in such a manner that it has the following two properties: 1) knowledge of the trace data of one vehicle does not allow an Attacker to identify/resolve/guess trace data from another vehicle; and 2) complete trace data from a device cannot be obtained if device is not installed in the vehicle. For example, it uses information from other devices to which it is connected.

Example Build Process for Autonomous Vehicle

Figure 7:
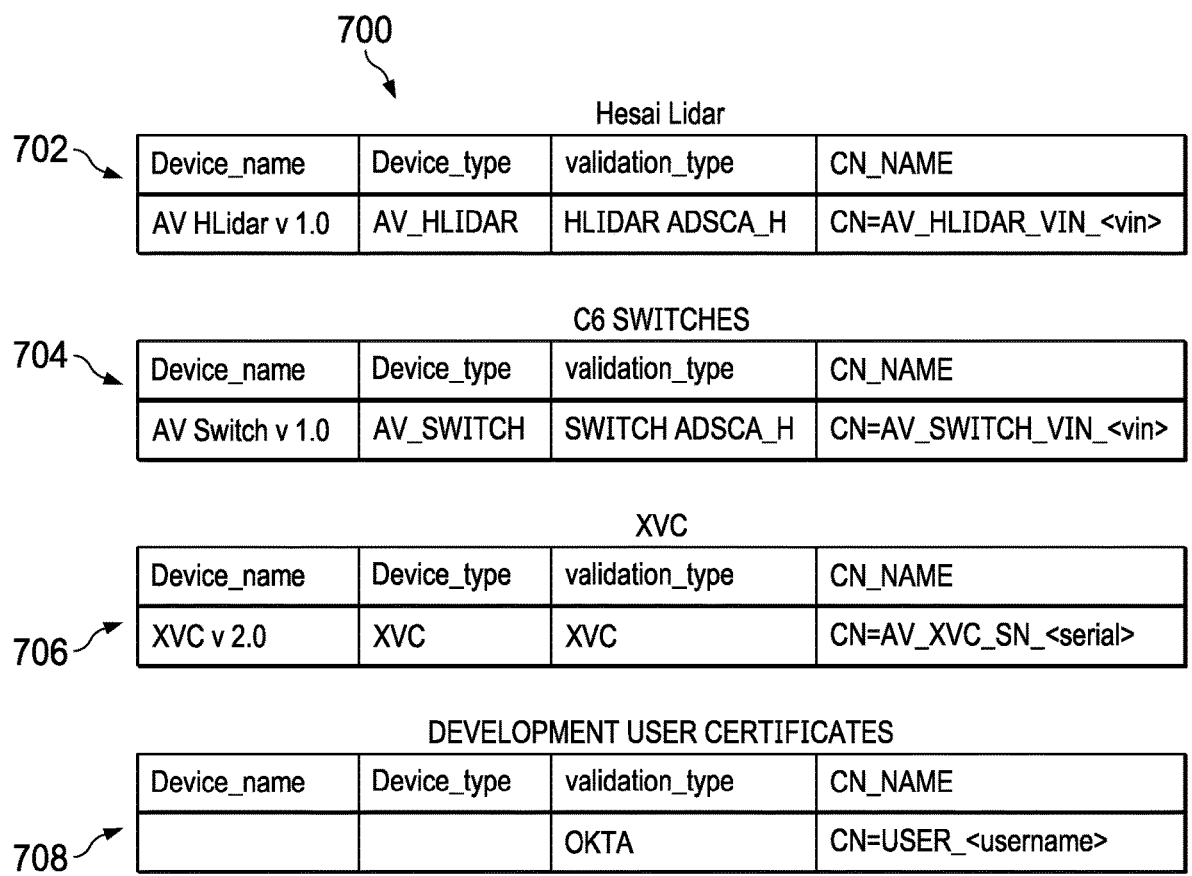

FIGS. 6-7 are example diagrams 600 and 700 illustrating formats for device registration according to some embodiments of the disclosure. More specifically, these formats are provided as examples for each supported ECU including CN format. Note that ECU is an automotive standard being used in example embodiments presented herein. In other embodiments, different ECUs can be provided as appropriate for particular options. Provided in FIG. 6 is an MCTM format 602, an HPDC format 604, and an ADSC format 606. In FIG. 7, a Hesai LIDAR format 702, a C6 Switches format 704, an XVC format 706, and a development user certificates format 708 is provided.

In operation of an example involving how to obtain session keys (e.g., for ADSC, MCTM, etc.), once the vehicle has successfully obtained a DR signed certificate, it can use this for authentication purposes. On each boot, each device obtains a set of secrets directly from the secrets manager that can be hosted in any appropriate location (e.g., in an instance of Hashicorp Vault in a proprietary server/Backoffice). The activity would be as follows. A given AV, for example using its onboard computer, can generate a session public/private keypair. It subsequently generates a CSR from this data. It signs the CSR using the private key that corresponds to the device registration certificate. In one example implementation, it then sends a request to the secrets manager that contains the device registration certificate, the CSR, a base64 encoded timestamp, and the base64 encoded signature.

When the secrets manager receives this request, it first verifies that the device registration certificate that was submitted is legitimate. This can be achieved by checking it against a certificate authority (CA) signed certificate it has already stored. Next, it uses the device registration certificate to verify that the provided signature is indeed correct. If the CSR is properly signed and the timestamp is recent, then the secrets manager returns a signed certificate corresponding to the CSR (except for the common name). It uses the common name of the device registration certificate and ignores the common name included in the CSR. The signature can be valid for any suitable time period (e.g., 1 hour, 12 hours, 24 hours, 1 week, etc.). It also returns a token that can be used for further communication with the secrets manager if necessary.

In one example embodiment, the secrets manager could be available only through designated communication paths (e.g., the IPsec tunnel, via garage Wi-Fi, etc.) and it would not be reachable on the Internet. The actual request could have any number of fields. In one embodiment, used for illustration purposes only, the following fields are used: 1) certificate—the DR certificate in Privacy Enhanced Mail (PEM) format; 2) csr—The CSR in PEM format; 3) csr_signature—base64 encoded signature of csr field; 4) timestamp—the number of seconds since the Unix epoch UTC (i.e. date –u+'% s'); 5) as an ascii string; 6) timestamp_signature—base64 encoded signature of timestamp field. On the server, the timestamp can be verified to be within provisioned/acceptable time period (e.g., 2 hours) in either direction of the current time.

In regard to the key rotation, the device registration keys and certificates are intended to be used for a relatively long time period. However, it is possible that keys could be rotated. Examples of this might include a compromised CA private key or a private key extracted from a TPM. In such a scenario, an update to the firmware of all devices that contained the device registration CA certificate would be appropriate. Once this is updated, the next time the device started up, it would attempt to verify that the device registration certificate it had was legitimate, but it would fail to do so. Upon observing that it did not have a valid device registration certificate, it would generate a new keypair and go through the device registration process again to fetch a new signed certificate from the device registration server. In essence, and in sum, one way to force a key rotation of the keys associated with the device registration process is to install a new CA certificate on the device or to delete the existing device registration certificate.

For the session keys, key rotation can occur on every boot. Recall that on every boot, new session keys can be generated, and a session certificate can be obtained from the secrets manager. Session keys are only valid for a prescribed time period (e.g., 24 hours). Therefore, additional key rotation would not be necessary for the session keys. In using session certificates, these certificates can be used within the car as proprietary validated credentials. Additionally, these can be used as TLS server certificates. For example, they can be used as mTLS client certificates. However, when used in practice, the CN should be routinely checked for the VIN. The VIN present in the CN should match the VIN of the current vehicle. This prevents session certificates in one vehicle from working on other vehicles. For the MCTM example scenario, the REST API that uses mTLS, may already include this check.

Example Registration Server and Database

Figure 8:
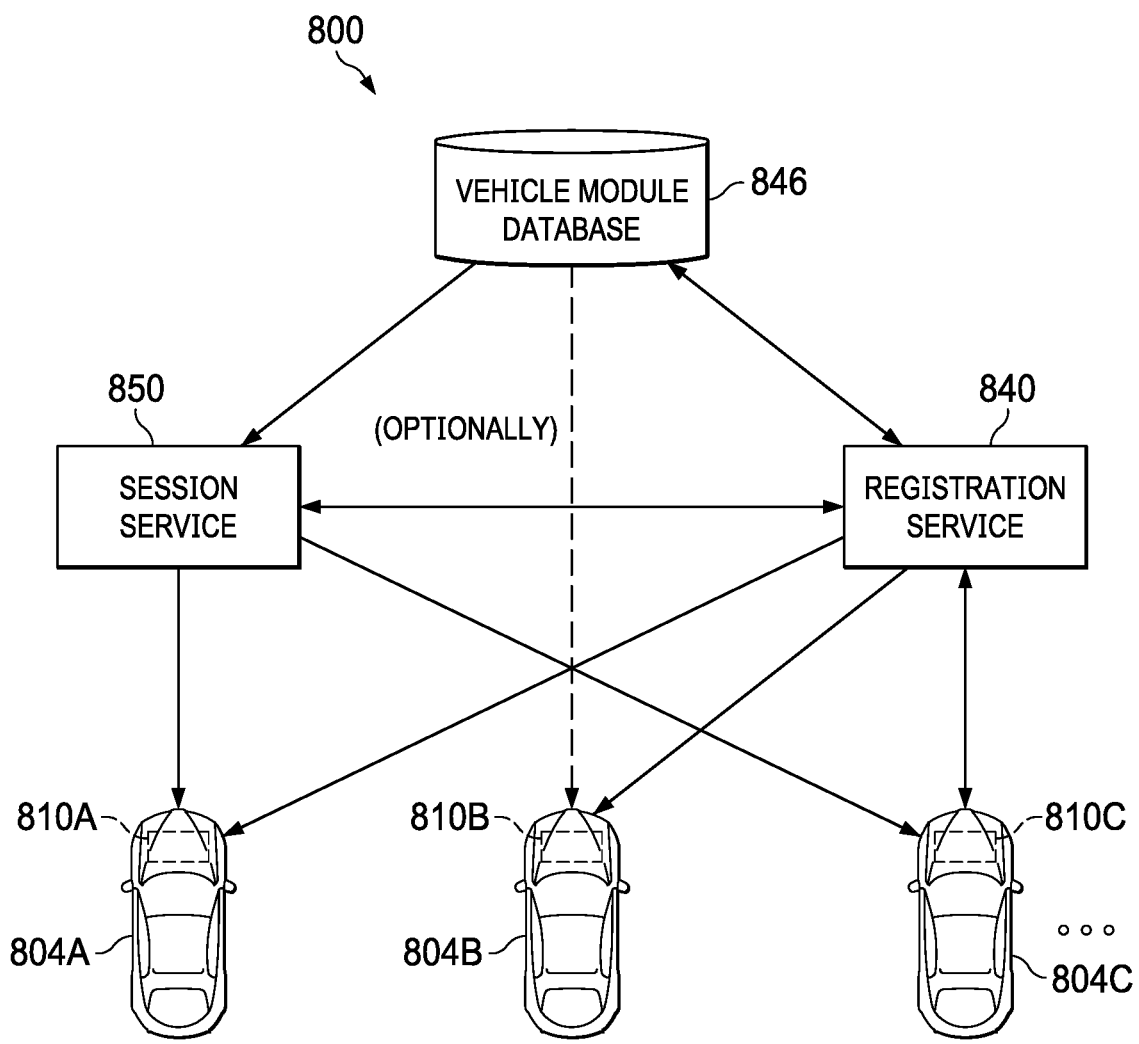
FIG. 8 is a diagram illustrating a database system for device registration, according to some embodiments of the disclosure.

FIG. 8 is a diagram 800 illustrating a fleet overview involving several AVs 810A-C, according to various implementations of the disclosure. The system includes a set of onboard computers 804A-C, an instance of a session service 850, an instance of a registration service 840, and a vehicle module database 846. Any one or more of these elements can be combined into a single server, software, hardware, module, database, etc., as appropriate and based on particular configuration requirements.

In operation of an example used for illustrative purposes only, a given organization responsible for the fleet of AVs can maintain a database that has rows indexed by each vehicle's VIN. A VIN number is a 17-digit number stamped into the chassis of a car and this serves as the car's unique identity code. For each vehicle, the organization can use fields for trace data from each device for which trace data is expected (e.g., with respect to ADSC, MCTM, HPDC). For each vehicle, fields can also be provided for the public key for each device that has successfully registered (using ADSC, MCTM, HPDC). Vehicle module database 846 can have a web application front end in example embodiments of the present disclosure. In such a case, it could have a public API that is identical to the one that the device registration server maintained. Additionally, there could be a web application that can be used for new vehicles, along with device replacement, which is described below.

For new vehicle initialization, once a new vehicle is sought to be put into service, a technician can log into a web interface to access vehicle module database 846. This web application can use a two-factor authentication mechanism. At this point, a technician can enter that a new vehicle has arrived with a particular VIN. On the backend of this system, this process will subsequently create an entry in vehicle module database 846 with that VIN with no other values entered.

As each device on the vehicle is first started, it will realize it does not have a long-term device registration certificate and, therefore, will attempt to do its device registration. For the HPDC and ADSC cases, the location of the device registration server, as well as necessary CA certificates can be hard coded in the firmware according to specific embodiments of the present disclosure. For the MCTM scenario, the location can be controlled via the provisioning service. Prior to registration, the device can generate a keypair (with the private key stored securely in hardware) and generate a suitable request. The device registration server would receive the registration request. It will notice that the corresponding entry in the database includes empty values. Instead of trying to compare the trace data from the request to empty values, in this case, it can set the values in the database. It can also set the public key in the field for whichever device is attempting to register. After this, it would accept the request and return a signed certificate. From the perspective of the vehicle, it will not be able to tell the difference between an initial device registration request that fills in the database and a later device registration (re-)request that is compared against values in the database.

Example Computing System

Figure 9:
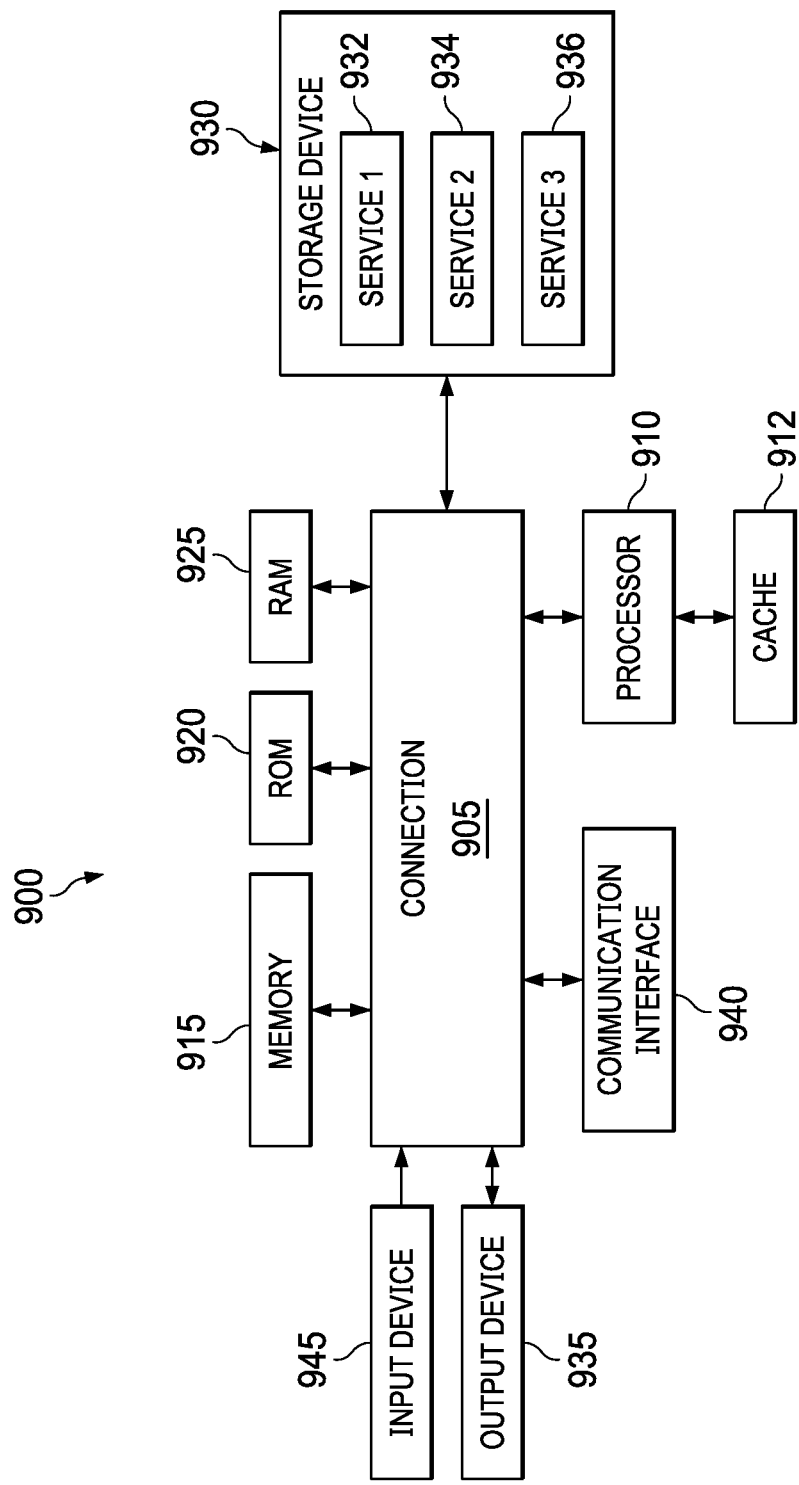
FIG. 9 shows an example embodiment of a system for implementing certain aspects of the present technology.

FIG. 9 shows an example embodiment of a computing system 900 for implementing certain aspects of the present technology. In various examples, the computing system 900 can be any computing device making up one or more (or any suitable combination) of the onboard computer 104, the registration module 206, the session module 208, the device registration service 240, the session service 250, the device certificate authority 278, the session certificate authority 282, the certificate revocation service 284, the device registration authority 442, the vehicle module database 446, or any of the other computing systems described herein. The computing system 900 can include any hardware, software, or component that allows for suitable communications using connection 905. The connection 905 can be a physical connection via a bus, or a direct connection into processor 910, such as in a chipset architecture. The connection 905 can also be a virtual connection, networked connection, or logical connection.

In some implementations, the computing system 900 is a distributed system in which the functions described in this disclosure can be distributed in any suitable fashion (e.g., within a datacenter, multiple data centers, a peer network, etc.). In some embodiments, one or more of the described system components represent many such components that area scaled: each performing some or all of the functions as described. In certain embodiments, the components can be physical or virtual devices. In other cases, the computing system 900 is proprietary to a specific organization, which may include, for example, certain protocols and database behaviors developed to facilitate the operations discussed herein with respect to session management, revocation activities, and certificate management generally.

The system 900 includes at least one processing unit (central processing unit (CPU) or processor) 910 and a connection 905 that couples various system components including system memory 915, such as read-only memory (ROM) 920 and random-access memory (RAM) 925 to processor 910. The computing system 900 can include a cache of high-speed memory 912 connected directly with, in close proximity to, or integrated as part of the processor 910.

The processor 910 can include any general-purpose processor and a hardware service or software service, such as services 932, 934, and 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms known to those of skill in the art. In some instances, multimodal systems can enable a user to provide multiple types of input/output to communicate with the computing system 900. The computing system 900 can include a communications interface 940, which can generally govern and manage the user input and system output. There is no restriction on operating on any particular hardware arrangement, and therefore the basic features here may easily be substituted for improved hardware or firmware arrangements as they are developed.

A storage device 930 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROM, and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the appropriate hardware components, such as a processor 910, a connection 905, an output device 935, etc., to conduct the function.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for managing a device in an autonomous vehicle, comprising: receiving a device registration request for the device; evaluating a list that includes a plurality of unique IDs associated with a plurality of certificates; determining whether a particular/first unique ID associated with a particular/first certificate is valid based on a length of time for the particular certificate; and communicating a signed version of the particular certificate to authorize a session for the device.

Example 2 provides a method according to example 1, further comprising: evaluating the length of time for which the particular certificate is valid; and revoking the particular certificate using the particular unique ID. Example 3 provides a method according to one or more of the preceding examples, further comprising: blocking new certificates associated with the particular unique ID from being generated. Example 4 provides a method according to one or more of the preceding examples, wherein short-lived certificates having shorter time intervals and long-lived certificates having longer time intervals share a same unique ID. Example 5 provides a method according to one or more of the preceding examples, further comprising: receiving an authentication request associated with the particular unique ID; and evaluating a global revocation list to determine whether to authorize the authentication request, wherein the global revocation list comprises one or more revoked IDs.

Example 6 provides a method according to one or more of the preceding examples, further comprising: determining that a given device was revoked in error; and enabling the given device based on updating a global revocation list, wherein the global revocation list comprises one or more revoked IDs. Example 7 provides a method according to one or more of the preceding examples, wherein the particular unique ID is stored in a CN field of the particular certificate. Example 8 provides a method according to one or more of the preceding examples, wherein the particular unique ID is partitioned into multiple subparts. Example 9 provides a method according to one or more of the preceding examples, wherein the multiple subparts include a VIN, a device type, and a device identifier associated with the particular device.

Example 10 provides a method according to one or more of the preceding examples, further comprising determining whether a group ID associated with a given certificate is valid based on a length of time for the given certificate; and communicating a signed version of the given certificate to authorize a session for a given device.

Example 11 provides a method according to one or more of the preceding examples, wherein the device registration request and a session registration request are received through a designated communication path that restricts Internet access. Example 12 provides a method according to one or more of the preceding examples, further comprising communicating an update to firmware stored in a plurality of devices for a plurality of AVs; and rotating one or more session keys to be used for the plurality of devices, wherein the session keys are valid for a designated length of time. Example 13 provides a method according to one or more of the preceding examples, wherein the device registration request includes trace data that is unique to the particular device, and wherein one or more communications for registration of the particular device are encrypted such that the trace data is not exposed.

Example 14 provides for one or more non-transitory computer-readable media storing instructions executable to perform operations for managing a device in an autonomous vehicle, the operations comprising: receiving a device registration request for the device; evaluating a list that includes a plurality of unique IDs associated with a plurality of certificates; determining whether a particular/first unique ID associated with a particular/first certificate is valid based on a length of time for the particular certificate; and communicating a signed version of the particular certificate to authorize a session for the device.

Example 15 provides a system according to one or more of the preceding examples, the operations further comprising: evaluating the length of time for which the particular certificate is valid; and revoking the particular certificate using the particular unique ID. Example 16 provides a system according to one or more of the preceding examples, the operations further comprising: receiving an authentication request associated with the particular unique ID; and evaluating a global revocation list to determine whether to authorize the authentication request, wherein the global revocation list comprises one or more revoked IDs. Example 17 provides a system according to one or more of the preceding examples, the operations further comprising: determining that a given device was revoked in error; and enabling the given device based on updating a global revocation list, wherein the global revocation list comprises one or more revoked IDs.

Example 18 provides a system according to one or more of the preceding examples, wherein the particular unique ID is stored in a common name field (e.g., CN field) of the particular certificate, and wherein the particular unique ID is partitioned into multiple subparts. Example 19 provides a system according to one or more of the preceding examples, wherein the multiple subparts include a VIN, a device type, and a device identifier associated with the particular device. Example 20 provides a system according to one or more of the preceding examples, the operations further comprising: determining whether a group ID associated with a given certificate is valid based on a length of time for the given certificate; and communicating a signed version of the given certificate to authorize a session for a given device. Example 21 provides a method according to one or more of the preceding examples, wherein certificate revocation and management includes storing respective data in volatile memory.

Example A is a one or more non-transitory computer-readable media comprising instructions stored thereon, wherein, the instructions, when executed by one or more processors, are to perform the operations of the methods according to one or more of the preceding examples.

VARIATIONS AND IMPLEMENTATIONS

While many implementations are described with respect to an autonomous vehicle, the implementations are also applicable to other vehicles (which may not necessarily be fully autonomous) where network security is a concern.

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by one or more hardware processing units, e.g., one or more microprocessors of one or more computers. In various embodiments, different steps, and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

What is claimed is:

1. A method for managing a device in a vehicle, comprising:
   receiving a device registration request for the device;
   evaluating a global revocation list that includes a plurality of unique identifiers (IDs) associated with a plurality of certificates;
   determining whether a first unique identifier (ID) associated with a first certificate is valid based on a length of time for the first certificate;
   communicating a signed version of the first certificate to authorize a session for the device;
   revoking the first certificate using the first unique ID;
   based on revoking the first certificate, adding the first certificate to the global revocation list;
   determining that the first certificate was revoked in error; and based on determining that the first certificate was revoked in error, enabling the first certificate by removing the first certificate from the global revocation list,
wherein short-lived certificates having shorter time intervals and long-lived certificates having longer time intervals share a same unique ID.

2. The method of claim 1, wherein revoking the first certificate comprises evaluating the length of time for which the first certificate is valid.

3. The method of claim 2, further comprising blocking new certificates associated with the first unique ID from being generated.

4. The method of claim 1, further comprising:
receiving an authentication request associated with the first unique ID; and
evaluating the global revocation list to determine whether to authorize the authentication request, wherein the global revocation list comprises one or more revoked IDs.

5. The method of claim 1, further comprising:
determining that a given device associated with the first certificate was revoked in error; and
enabling the given device based on updating the global revocation list, wherein the global revocation list comprises one or more revoked IDs.

6. The method of claim 1, wherein the first unique ID is stored in a common name field of the first certificate.

7. The method of claim 1, wherein the first unique ID is partitioned into multiple subparts.

8. The method of claim 7, wherein the multiple subparts include a vehicle identification number, a device type, and a device identifier associated with the device.

9. The method of claim 1, further comprising:
determining whether a group ID associated with a given certificate is valid based on a length of time for the given certificate; and
communicating a signed version of the given certificate to authorize a session for a given device.

10. The method of claim 1, wherein the device registration request and a session registration request are received through a communication path that restricts Internet access.

11. The method of claim 1, further comprising:
communicating an update to firmware stored in a plurality of devices for a plurality of vehicles; and
rotating one or more session keys to be used for the plurality of devices, wherein the session keys are valid for a length of time.

12. The method of claim 1, wherein the device registration request includes trace data that is unique to the device, and wherein one or more communications for registration of the device are encrypted such that the trace data is not exposed.

13. One or more non-transitory computer-readable media storing instructions executable to perform operations for managing a device in a vehicle, the operations comprising:
receiving a device registration request for the device;
evaluating a global revocation list that includes a plurality of unique identifiers (IDs) associated with a plurality of certificates;
determining whether a first unique identifier (ID) associated with a first certificate is valid based on a length of time for the first certificate; communicating a signed version of the certificate to authorize a session for the device;
revoking the first certificate using the first unique ID;
based on revoking the first certificate, adding the first certificate to the global revocation list;
determining that the first certificate was revoked in error; and
based on determining that the first certificate was revoked in error, enabling the first certificate by removing the first certificate from the global revocation list,
wherein short-lived certificates having shorter time intervals and long-lived certificates having longer time intervals share a same unique ID.

14. The one or more non-transitory computer-readable media of claim 13, wherein revoking the first certificate comprises evaluating the length of time for which the first certificate is valid.

15. The one or more non-transitory computer-readable media of claim 14, the operations further comprising blocking new certificates associated with the first unique ID from being generated.

16. The one or more non-transitory computer-readable media of claim 14, the operations further comprising:
receiving an authentication request associated with the first unique ID; and
evaluating the global revocation list to determine whether to authorize the authentication request, wherein the global revocation list comprises one or more revoked IDs.

17. The one or more non-transitory computer-readable media of claim 13, the operations further comprising:
determining that a given device associated with the first certificate was revoked in error; and
enabling the given device based on updating the global revocation list, wherein the global revocation list comprises one or more revoked IDs.

18. The one or more non-transitory computer-readable media of claim 13, wherein the first unique ID is stored in a common name field of the first certificate, and wherein the first unique ID is partitioned into multiple subparts.

19. One or more non-transitory computer-readable media storing instructions executable to perform operations for managing a device in a vehicle, the operations comprising:
receiving a device registration request for the device;
evaluating a global revocation list that includes a plurality of unique identifiers (IDs) associated with a plurality of certificates;
determining whether a first unique identifier (ID) associated with a first certificate is valid based on a length of time for the first certificate;
communicating a signed version of the certificate to authorize a session for the device;
evaluating the length of time for which the first certificate is valid;
revoking the first certificate using the first unique ID;
blocking new certificates associated with the first unique ID from being generated;
based on revoking the first certificate, adding the first certificate to the global revocation list;
determining that the first certificate was revoked in error; and
based on determining that the first certificate was revoked in error, enabling the first certificate by removing the first certificate from the global revocation list,
wherein short-lived certificates having shorter time intervals and long-lived certificates having longer time intervals share a same unique ID.

* * * * *